United States Patent
Mansour et al.

(10) Patent No.: US 11,695,536 B1
(45) Date of Patent: Jul. 4, 2023

(54) DYNAMIC ADJUSTMENT OF TDD CONFIGURATION IN RESPONSE TO UPLINK VOICE MUTING

(71) Applicant: Sprint Spectrum L.P., Overland Park, KS (US)

(72) Inventors: Nagi Mansour, Arlington, VA (US); Akin Ozozlu, Mclean, VA (US); Ashish Tuli, Fairfax, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 202 days.

(21) Appl. No.: 17/249,307

(22) Filed: Feb. 26, 2021

(51) Int. Cl.
| | | |
|---|---|---|
| *H04W 72/04* | (2023.01) | |
| *H04L 45/28* | (2022.01) | |
| *H04L 5/14* | (2006.01) | |
| *H04W 72/0446* | (2023.01) | |
| *H04W 56/00* | (2009.01) | |
| *H04W 28/18* | (2009.01) | |
| *H04W 4/16* | (2009.01) | |
| *H04W 76/16* | (2018.01) | |
| *H04W 24/08* | (2009.01) | |
| *H04W 48/02* | (2009.01) | |

(52) U.S. Cl.
CPC ........... *H04L 5/14* (2013.01); *H04W 72/0446* (2013.01)

(58) Field of Classification Search
CPC .............................. H04L 5/14; H04W 72/0446
See application file for complete search history.

(56) References Cited

U.S. PATENT DOCUMENTS

| | | | |
|---|---|---|---|
| 10,034,181 B1* | 7/2018 | Somashekar | H04W 16/28 |
| 10,305,943 B1* | 5/2019 | Lu | H04L 65/70 |
| 11,026,131 B1* | 6/2021 | Marupaduga | H04M 7/006 |
| 2015/0373698 A1* | 12/2015 | Uplenchwar | H04W 72/27 455/452.2 |
| 2016/0080984 A1* | 3/2016 | Turakhia | H04W 36/00 370/230 |
| 2016/0183188 A1* | 6/2016 | Tsai | H04W 52/0229 370/311 |
| 2017/0150386 A1* | 5/2017 | Hoover | H04W 24/10 |
| 2018/0196715 A1* | 7/2018 | Balasubramanian | H04L 67/1097 |
| 2019/0182020 A1* | 6/2019 | Patel | H04L 1/189 |
| 2020/0252875 A1* | 8/2020 | Qiu | H04W 52/0248 |

* cited by examiner

*Primary Examiner* — Huy D Vu
*Assistant Examiner* — Bailor C Hsu
(74) *Attorney, Agent, or Firm* — McDonnell Boehnen Hulbert & Berghoff LLP (57) ABSTRACT

A method for controlling configuration of an air interface between an access node and at least one user equipment device (UE), where the air interface is divided over time into frames and the frames are further divided at least into subframes, where the air interface operates in accordance with a time-division-duplex (TDD) configuration that defines at least a number of uplink subframes per frame for communication over the air interface. An example method includes (i) detecting at least a threshold high rate of uplink voice muting on the air interface, and (ii) responsive to at least the detecting, changing the TDD configuration to increase the number of uplink subframes per frame over the air interface.

18 Claims, 4 Drawing Sheets

DETECT AT LEAST A THRESHOLD HIGH RATE OF UPLINK VOICE MUTING ON AN AIR INTERFACE, THE AIR INTERFACE DEFINING A TDD CONFIGURATION — 32

RESPONSIVE TO AT LEAST THE DETECTING, CHANGE THE TDD CONFIGURATION OF THE AIR INTERFACE TO INCREASE THE NUMBER OF UPLINK SUBFRAMES PER FRAME OVER THE AIR INTERFACE — 34

DYNAMIC ADJUSTMENT OF TDD CONFIGURATION IN RESPONSE TO UPLINK VOICE MUTING

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, a reference signal that UEs could measure in order to determine coverage strength, and other control signaling such as PRB-scheduling directives and acknowledgement messaging from the access node to served UEs. And on the uplink, certain resource elements could be reserved to carry random access signaling from UEs to the access node, and other control signaling such as PRB-scheduling requests and acknowledgement signaling from UEs to the access node.

OVERVIEW

When an access node's coverage area operates on a TDD carrier, the carrier could be structured with a particular TDD configuration (frame configuration) defining a sequence of equal-duration subframes and establishing which subframes are for downlink use and which subframes are for uplink use. Further, the TDD configuration may designate certain subframes as special subframes that are part downlink and part downlink, to help facilitate transition from downlink to uplink operation. Thus, a representative TDD configuration could establish for each subframe per frame whether the subframe is a downlink subframe (D), an uplink subframe (U), or a special subframe (S).

Various TDD configurations could be feasible. In LTE, for instance, the air interface on a TDD carrier defines a continuum of 10-millisecond frames, each divided into ten 1-millisecond subframes, and LTE defines seven standard TDD configurations as set forth in Table 1.

TABLE 1

| TDD Configuration | Subframe Number (0-9) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Non-standard implementations and/or other radio access technologies may define these or other frame structures and other TDD configurations as well.

In practice, an access node that provides a coverage area on a carrier having any such TDD configuration could broadcast in the coverage area a system information message that specifies the carrier's TDD configuration, so that UEs served by the access node in the coverage area could determine the TDD configuration and operate accordingly. For instance, an access node could broadcast a System Information Block (SIB) message in subframe 0 of each frame and could include in the SIB message a specification of the carrier's TDD configuration, such as a frame configuration (FC) number. Thus, a UE that is within that coverage area of the access node could read that broadcast SIB message to determine the TDD configuration of the coverage area's carrier. Alternatively, a UE might determine the TDD configuration of a carrier in other ways, such as by monitoring to determine the subframes in which the access node transmits per frame.

When a UE enters into coverage of such a system, the UE could detect threshold strong coverage of an access node (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE. Further, if the UE is not already registered for service, the UE could engage in attach signaling via the access node with a core-network controller, to attach and thus register for service.

Upon initial attachment and/or at other times when serving a UE, the system could coordinate setup for the UE of one or more user-plane bearers, each defining a logical packet flow for packet-data communications between the UE and a core-network gateway system that provides connectivity packet-data network connectivity. For instance, after authenticating and authorizing the UE, the core-network controller could engage in signaling with the access node and with the gateway system, to coordinate setup of each such bearer, including a radio-bearer portion extending between the UE and the access node and an access-bearer portion extending between the access node and the gateway system.

Each such bearer could support communication between the UE and the gateway system and thus ultimately between the UE and the packet data network with which the gateway system provides connectivity. When data on the network arrives at the gateway system for transmission to the UE, the data could then flow over a bearer from the gateway system to the access node and from the access node to the UE. And when the UE has data to transmit on the packet data network, the data could flow over a bearer from the UE to access node and from the access node to the gateway system for output onto the packet data network.

Further, for the air-interface portion of each such transmission, the access node could coordinate allocation of air-interface resources to carry the data between the access node and the UE. With the example air-interface configuration noted above, for instance when the access node has data to transmit to the UE, the access node could allocate one or more downlink PRBs in an upcoming subframe for carrying a block of the data to the UE and could then transmit the data to the UE in the allocated PRB(s). And when the UE has data to transmit to the access node, the UE could transmit to the access node a buffer status report (BSR) indicating how much data the UE has buffered for transmission, the access node could allocate one or more uplink PRB(s) in an upcoming subframe for carrying a block of that data from the UE, and the UE could then transmit the data to the access node in the allocated PRB(s).

This process could be used to facilitate various types of communication by various types of UEs. For example, the process could enable wirelessly-equipped smart phones and other computing devices to engage in general Internet communications as well as packet-based real-time media communications such as voice over Internet Protocol (VoIP) communication, streaming video communication, and gaming, among other possibilities.

When a UE engages in a VoIP call, for instance, the UE and a remote entity may exchange packets that carry digitized voice-band audio or that are coded to cause playout of natural background noise during periods of silence in the call. A typical VoIP implementation would have each end of the call generate and transmit VoIP packet at a regular rate, such as one packet every 20 milliseconds. Thus, the UE's serving access node may schedule transmission of a VoIP packet over the air from the UE to the access node every 20 milliseconds and may schedule transmission of a VoIP over the air from the access node to the UE every 20 milliseconds.

In a representative system, to help ensure successful air-interface transmission between the access node and a served UE (on the downlink and/or uplink), the access node and UE could be configured to apply an automatic retransmission process, such as a Hybrid Automatic Repeat Request (HARQ) process.

With HARQ, after a transmitting entity has transmitted a block of data to a receiving entity, possibly together with forward-error-correction coding, the transmitting entity waits to receive a HARQ response from the receiving entity, based on the receiving entity's evaluation of whether the data arrived successfully (e.g., based on a cyclic redundancy check (CRC)). If the transmitting entity receives a positive acknowledgement (ACK) as the HARQ response, then no re-transmission is needed and the transmitting entity can proceed to transmit additional data. Whereas, if the transmitting entity receives a negative acknowledgement (NACK) as the HARQ response, then the transmitting entity re-transmits the data, possibly with different error-correction coding. Further, the transmitting entity may also re-transmit the data if the transmitting entity does not receive any HARQ response within a certain period of time.

This re-transmission approach can allow data to be successfully decoded by the receiving entity even when there is a substantial probability that the transmitted data would be received with one or more errors, for example, because of poor radio frequency (RF) conditions. Specifically, the data can be re-transmitted multiple times (e.g., up to a set re-transmission limit), possibly with varying error-correction coding, until the receiving entity can decode the data without errors.

This re-transmission approach, however, also increases latency. For example, for each re-transmission, there can be a period of delay between when the transmitting entity transmits data and when the transmitting data receives a NACK response from the receiving entity, and there can be another period of delay between when the transmitting entity receives the NACK response and when the transmitting entity then re-transmits the data. This latency issue could be especially troubling for latency-sensitive communications, such as VoIP communication or other packet-based real-time media communications.

In order to reduce the delay associated with re-transmitting data, the representative system could also be configured to support a bundling option for data transmissions. For instance, while scheduled transmission of a transport block may normally occur in just one TTI (e.g., one subframe) and the transmitting entity may then wait to receive a HARQ response before re-transmitting the transport block or proceeding to transmit another transport block, the system could instead allow for "TTI bundling."

With TTI bundling, the transmitting entity would automatically transmit a block of data repeatedly in multiple (e.g., consecutive) TTIs defining a TTI bundle, and the receiving entity would then provide a HARQ responsive for that set of transmissions cooperatively rather than providing a separate HARQ response after each transmission. After the transmitting entity provides the transmissions repeatedly in the multiple TTIs, the transmitting entity would then wait to receive a HARQ response for that group of transmissions as a whole—i.e., a HARQ response indicating whether or not the receiving entity successfully received the block of data.

This TTI bundling process could allow for more robust reception of data, without the delay that would be associated with the transmitting entity transmitting the data multiple times and waiting for a HARQ response respectively after each transmission. Therefore, the TTI bundling process could be especially useful for VoIP and other such real-time media communications.

Unfortunately, however, in situations where an access node's air interface is too heavily loaded and/or for other reasons, the access node may sometimes be unable to accommodate transmission of voice packets over the air interface in a timely manner. And this could result in some of the packets not being processed for playout, which could in turn create breaks in the audio and result in voice call quality and user-experience issues. The failure to communicate voice packets, perhaps such failure occurring for a threshold amount of time (e.g., 300 milliseconds), is known as voice muting.

Voice muting can be especially problematic for uplink communications, because UEs are generally more transmission-power limited than access nodes. In practice, for instance, given the UE's limited uplink transmission power, particularly when faced with uplink noise or interference, the UE's uplink VoIP packet transmission may fail. Further, especially if the uplink of the air interface is heavily loaded, there may be insufficient uplink air interface capacity to accommodate uplink TTI bundling. Ultimately, this could result in the UE being unable to successfully transmit some of its VoIP packets to the access node within the expected 20-millisecond timeframe per packet consecutively for the threshold amount of time (e.g., 300 milliseconds), thereby resulting in an instance of voice muting.

The present disclosure provides a mechanism that may help address this issue.

The disclosed mechanism could apply in a system as noted above, in which an access node serves at least one UE on an air interface that is divided over time into frames and the frames are further divided into subframes, where the air interface operates in accordance with a TDD configuration that defines at least a number of uplink subframes per frame for communication over the air interface.

In accordance with the disclosure, a computing system could detect a poor quality of uplink voice call communication, such as a high level of uplink voice muting, on the access node's air interface, and the computing system could respond to detecting the poor quality of uplink voice call communication by dynamically changing the TDD configuration of the air interface in a manner that may help address the quality issue. For instance, the computing system could detect at least a threshold high rate of uplink voice muting on the air interface, and, in response, the system could change the TDD configuration of the air interface to increase the number of uplink subframes per frame on the air interface. Optimally, the act of increasing the number of uplink subframes per frame on the air interface may allow for more uplink retransmissions, which may facilitate timely scheduling of uplink communications and may thus improve the quality of uplink call communication. Further, allowing for more uplink transmissions may help to reduce the level of voice muting, which may also improve the quality of uplink voice call communication on the air interface.

These as well as other aspects, advantages, and alternatives will become apparent to those of ordinary skill in the art by reading the following detailed description, with reference where appropriate to the accompanying drawings.

Further, it should be understood that the descriptions provided in this overview and below are intended to illustrate the invention by way of example only and not by way of limitation.

DETAILED DESCRIPTION

As noted above, FIG. 1 is a simplified block diagram of an example network arrangement in which features of the present disclosure can be implemented. It should be understood, however, that the principles disclosed herein could extend to apply with respect to other scenarios as well. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
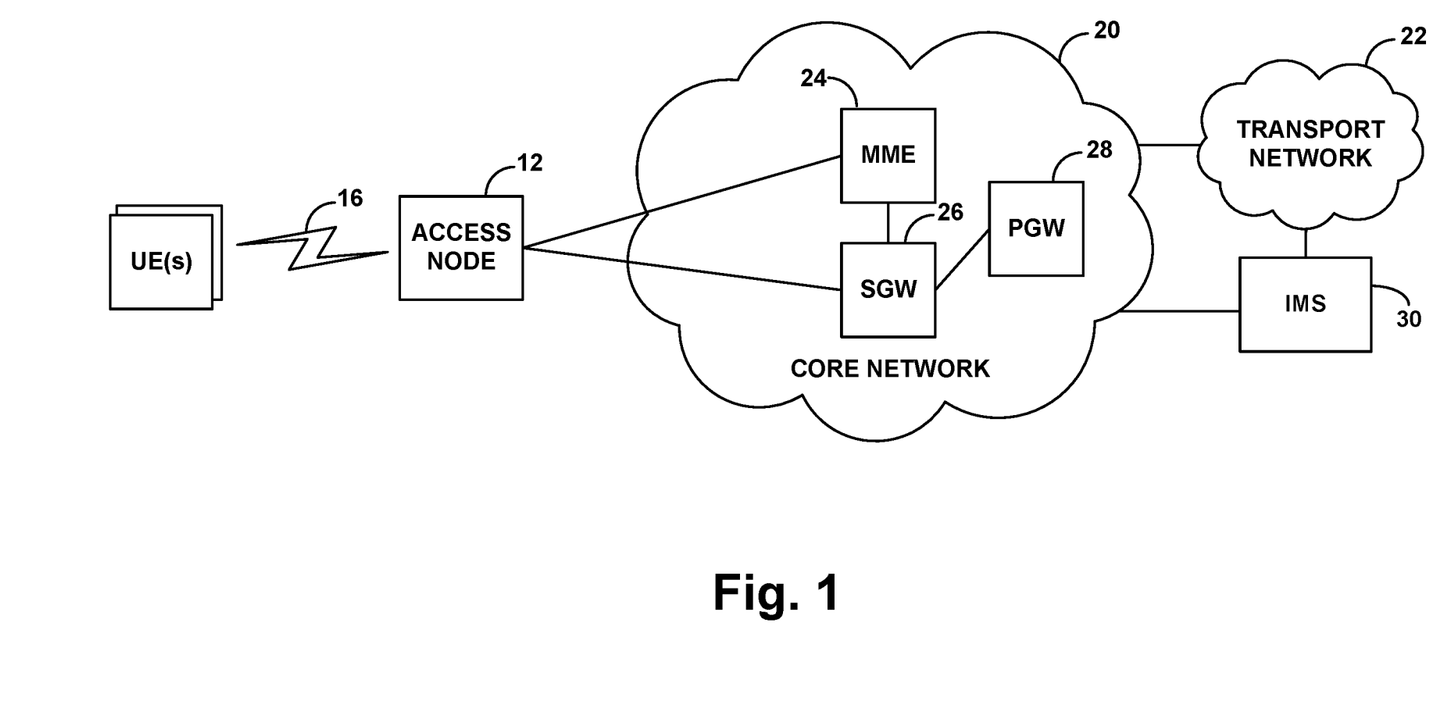
FIG. 1 is a simplified block diagram of an example network arrangement in which features of the present disclosure can be implemented.

FIG. 1 depicts example access node 12, which could be one of many that could be included in the network. The access node 12 could be a macro access node, a small cell access node, or other type of access node designed to provide wireless coverage in which to serve UEs. The access node 12 could configured to serve UEs in accordance with one or more defined RATs, and the access node 12 could vary in form from each other. Further, the access node 12 could have a respective antenna structure that is configured to transmit and receive electromagnetic signals on carrier 16 in a region defined by an antenna pattern or radiation pattern, so as to provide one or more coverage areas each on defined frequency and with a defined geographic scope of coverage. These and other attributes of coverage and operation provided by the access node 12 may vary from time to time as well.

In an example implementation, the access node 12 could be interconnected with one or more core networks 20, which could provide connectivity with one or more external transport networks 22 such as the Internet for instance. Each such core network could take various forms, examples of which include without limitation an Enhanced Packet Core (EPC) network and a Next Generation Core (NGC) network. As shown by way of example, the core network could include a mobility management entity (MME) 24, a serving gateway (SGW) 26, and a packet-data-network gateway (PGW) 28, among other nodes. With this arrangement, the access node 12 could have a communication interface with the MME, with the SGW, and perhaps with other access nodes, the MME could have a communication interface with the SGW, the SGW could have a communication interface with the PGW, and the PGW could provide connectivity with a transport network 22.

As a UE enters into coverage of access node 12, the UE could discover coverage of the access node 12 on carrier 16, such as by reading broadcast signaling from the access node 12 on the carrier, and could then engage in random access and connection signaling with the access node to establish a connection through which the access node 12 could then serve the UE. Further, if the UE is not yet registered for service, the UE could engage in attachment signaling with the MME 24 via the access node 12, and the MME 24 could coordinate setup of one or more user-plane bearer tunnels between the UE and the PGW 28 including for each a data radio bearer over the air between the access node and the UE and an access bearer through the core network between the access node and the PGW 28. The access node 12 may then serve the UE on the carrier, coordinating use of air interface resources such as PRBs to carry data to and from the UE.

In a representative system, each bearer that is established for the UE could have a corresponding defined quality-of-service (QoS) service level, which could be indicated by one or more bearer attributes stored in context records for the UE at entities along the bearer path, such as at the UE, the access node, and the gateway system. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

The QCI or DSCP value of each such bearer could also correspond with the type or class of data that would be communicated on the bearer, and data communications of particular types could thus be provided on appropriate bearers. For instance, QCI 1 could denote conversational voice traffic, QCI 2 could denote conversational video traffic, QCI 3 could denote gaming traffic, QCI 4 could denote buffered/streaming video traffic, QCI 5 could denote signaling with an Internet Multimedia Subsystem (IMS) 30 for setting up and controlling real-time media communications such as voice calls, and other QCIs might denote other sorts of traffic.

In an example implementation, a UE that is connected with access node 12 and that supports VoIP communication could set up and engage in a VoIP call hosted by the IMS 30. Through the UE's connection with the access node and an IMS-signaling bearer, the UE could engage in Session Initiation Protocol (SIP) signaling with the IMS 30 to establish a Real-time Transport Protocol (RTP) session through which the UE and IMS 30 could then exchange RTP packets carrying digitized voice-band audio or associated coding. The IMS 30 may also establish a connection with a remote call party, and the IMS 30 may bridge that connection with the UE's RTP session, so that the UE and the remote party could then engage in voice-call communication. Further in relation to setup of this VoIP call, the MME 24 could coordinate setup for the UE of a QCI-1 bearer over which the RTP packets could flow between the UE and the PGW 28, and the MME 24 could coordinate setup of a similar process for the remote party. With this VoIP call and QCI-1 bearer set up, RTP packets could then flow between the UE and IMS 30 and between the IMS 30 and the remote party, with the access node coordinating air-interface transmission of these packets as discussed above.

Normally in a VoIP call, each participating party may generate and transmit voice packets at a regular rate, such as every 20 milliseconds for instance, with each voice packet (e.g., RTP packets) carrying digitized voice-band audio for playout by the other party or being coded to cause the other party to play out natural background noise when there is no talking in the call. As mentioned above, when an access node's air interface is too heavily loaded, however, and/or for other reasons, the access node may be unable to schedule transmission of the voice packets over the air interface in a timely manner. And that could result in some of the packets not being processed for playout, which could create breaks in the audio and result in voice call quality issues.

As mentioned above, the present disclosure provides a mechanism that may help address this issue.

In an example system, carrier 16 on which access node 12 provides coverage could be a TDD carrier structured with a particular TDD configuration defining at least a sequence of uplink time intervals. The air interface on each of these carriers could be divided over time into frames and the frames could be further divided into subframes and could operate in accordance with the respective TDD configuration of the TDD carrier. For instance, considering the example TDD configurations shown above in Table 1, carrier 16 might be structured with any such TDD configuration, and the air interface on each of these carriers would likewise operate in accordance with the TDD configuration. Numerous other TDD configurations are possible as well, in terms of the time interval definitions, and in other aspects.

In line with the discussion above, the problem of voice call quality and user-experience issues (e.g., voice muting) could be addressed by detecting a poor quality of uplink voice call communication, such as a high level of voice muting, on an access node's air interface, and responding to detecting the poor quality of uplink voice call communication by dynamically changing the TDD configuration of the air interface.

This process could be carried out by any of the various entities in the arrangement of FIG. 1, among other possibilities. Without limitation, for instance, the process could be carried out by access node 12 and/or by one or more associated entities. Further, or alternatively, the process could be carried out by a core-network element management system (EMS) (not shown) of core network 20 or other computing system.

In an example implementation, the access node 12 could monitor the level of uplink voice muting on the air interface by monitoring for the absence of expected uplink voice packet (e.g., RTP packet) transmission for a threshold amount of time on various QCI-1 bearers of UEs served by the access node 12. As noted above, for instance, in a representative VoIP call, the expectation may be that the UE would transmit a voice packet every 20 milliseconds. However, in some cases, the access node 12 may detect that no voice packet is successfully retrieved from the UE within this 20 millisecond time frame.

If the access node 12 detects this failure of expected uplink voice packet communication from the UE for a threshold amount of time, then the access node could record that as being an instance of voice muting. For example, the access node 12 could be set such that a threshold amount of time is 300 milliseconds, and accordingly, the access node 12 could record voice muting instances where absence of expected uplink packet communication from the UE was detected for 15 consecutive 20-millisecond periods. Alternatively, the UE, SGW, an S1 packet sniffer, and/or any other entity in the QCI-1 bearer path could engage in this monitoring and could inform the access node 12 of instances of voice muting.

The access node 12 could then regularly track one or more instances of voice muting involving the at least one UE being served by that access node. And the access node 12 could regularly compare the tracked one or more instances of voice muting with a predefined rate of voice muting that is deemed high enough to justify increasing the number of uplink subframes per frame over the air interface. If the at least one UE experiences a threshold high rate of such instances of voice muting and/or if multiple UEs cooperatively served by the access node experience a threshold high rate of such instances of voice muting (and perhaps per unit time), then the access node could take action to address it, per the present disclosure.

Further, this detecting of a threshold high rate of uplink voice muting could be predictive based on historical records of past communications. For example, the access node could collect operational data on the times of day, which could facilitate predicting that, at a time of day, the rate of uplink voice muting is at least threshold high. In some examples, the act of changing the TDD configuration to increase the number of uplink subframes per frame over the air interface could be based on a current time of day being the time of day when the uplink voice muting is at least threshold high as indicated by the operational data.

In some examples, changing the TDD configuration could involve selecting a second TDD configuration. The access node 12 could change the TDD configuration from a first TDD configuration by selecting a second TDD configuration based on it having a greater number of uplink subframes per frame than the first TDD configuration. After selecting the second TDD configuration, the access node could be configured to operate within the second TDD configuration instead of the first TDD configuration. For example, referring back to Table 1, the first TDD configuration could be TDD configuration 3, which defines three subframes per frame (specifically, subframes 2, 3, and 4). After detecting that the rate of uplink voice muting is at least threshold high, then the access node could change the TDD configuration to a second TDD configuration having a greater number of uplink subframes per frame than the first TDD configuration, for instance TDD configuration 6, which defines five subframes per frame (specifically, subframes 2, 3, 4, 7, and 8).

Changing the TDD configuration could involve broadcasting a system message. By way of example, upon detecting at least a threshold high rate of uplink voice muting on the air interface, the access node 12 could broadcast a system message, which could be, for example, a SIB message that specifies another TDD configuration. A UE being served by the access node 12 could read the broadcasted SIB message to determine the new TDD configuration to which the access node 12 operates in accordance.

Further, the act of changing the TDD configuration could be temporary.

For example, the access node could revert the TDD configuration from the second TDD configuration to the first TDD configuration based on monitoring the uplink voice muting over the air interface. If and when the access node detects a threshold high rate of uplink voice muting on the air interface and/or changes the TDD configuration to increase the number of uplink subframes per frame, the access node can continue to monitor the uplink voice muting over the air interface for a rate of uplink voice muting that is no longer threshold high. For example, the access node could monitor for a threshold low rate of uplink voice muting. And upon detection that the rate of uplink voice muting over the air interface is no longer threshold high, the access node could change the TDD configuration to revert to the first TDD configuration.

Alternatively or additionally, the access node could revert from the second TDD configuration to the first TDD configuration after a predetermined amount of time. Upon detection of a threshold high rate of uplink voice muting on the air interface and/or upon changing the TDD configuration to increase the number of uplink subframes per frame, the access node could apply a timer set for a predetermined time period. Upon expiration of the timer, the access node could then revert to the first TDD configuration. Alternatively, upon expiration of the timer, the access node could newly evaluate the uplink voice muting or other voice quality issues on the air interface during a recent time period to determine whether or not to revert back to the first TDD configuration.

As discussed herein, threshold high could be at least as high as a predefined threshold, and threshold low could be at least as low as a predefined threshold. For example, a threshold high rate of uplink voice muting could be a rate of uplink voice muting that is at least as high as (or higher than) a predefined threshold rate, and a threshold low rate of uplink voice muting could be a rate of uplink voice muting that is at least as low as (or lower than) a predefined threshold rate.

Figure 2:
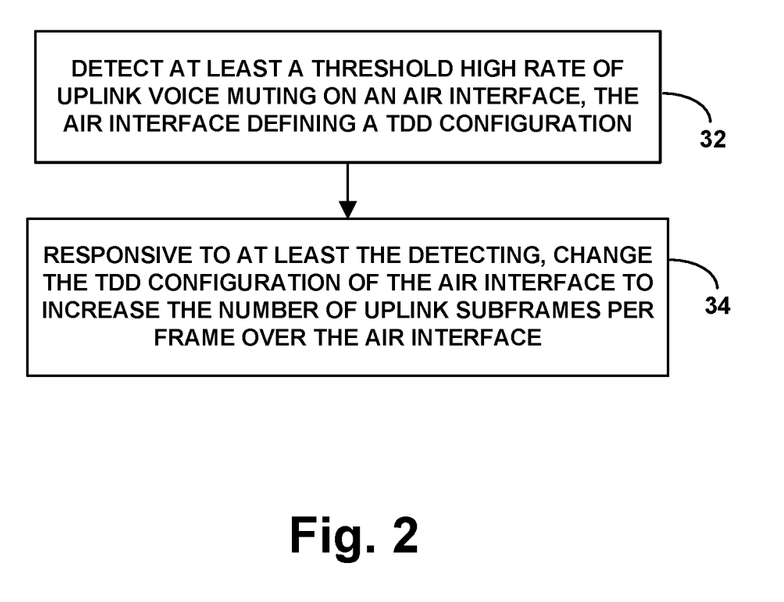
FIG. 2 is a flow chart depicting a method that could be carried out in accordance with the disclosure.

FIG. 2 is a flow chart depicting a method that could be carried out in accordance with the present disclosure to control configuration of an air interface between an access node and at least one UE, where the air interface is divided over time into frames and the frames are further divided at least into subframe. The air interface could operate in accordance with a TDD configuration that defines at least a number of uplink subframes per frame for communication over the air interface. As noted above, this process could be carried out by the access node or other computing system.

As shown in FIG. 2, at block 32, the method includes detecting at least a threshold high rate of uplink voice muting on the air interface. And at block 34, the method includes, responsive to at least the detecting, changing the TDD configuration to increase the number of uplink subframes per frame over the air interface.

In line with the discussion above, the act of detecting at least a threshold high rate of uplink voice muting could involve detecting one or more instances of voice muting on the air interface and determining that the one or more instances of voice muting have occurred at a rate that is at least as high as a predefined threshold rate. And the predefined threshold rate could be defined as a number of instances of uplink voice muting per unit time, and the act of detecting an instance of uplink voice muting on the channel could involve monitoring for absence of expected uplink voice-packet transmission on the air interface from the at least one UE.

Further, the uplink voice muting on the air interface could comprise an absence of expected voice-packet transmission on the air interface for a threshold time period.

In addition, as discussed above, the act of detecting the threshold high rate of uplink voice muting on the air interface could be predictive based on historical records of past communications. And the historical records of past communications could indicate a time of day during which a threshold high extent of uplink voice muting on the air interface was detected, and the act of changing the TDD configuration to increase the number of uplink subframes per frame over the air interface could further be based on a current time of day being that time of day.

In some examples, the TDD configuration could be a first TDD configuration, and changing the TDD configuration could comprise changing the TDD configuration from the first TDD configuration to a second TDD configuration having more uplink subframes per frame than the first TDD configuration.

The method could then further comprise, after changing the TDD configuration from being the first TDD configuration to being instead the second TDD configuration to increase the number of uplink subframes per frame for communication over the air interface, reverting to the first TDD configuration after a predetermined time period.

Additionally or alternatively, the method could comprise, after changing the TDD configuration from being the first TDD configuration to being instead the second TDD configuration to increase the number of uplink subframes per frame for communication over the air interface, detecting at least a threshold low rate of uplink voice muting on the air interface, and in response to detecting at least a threshold low rate of uplink voice muting on the air interface, reverting to the first TDD configuration.

The act of changing the TDD configuration to the second TDD configuration could comprise selecting the TDD configuration based on the second TDD configuration having a greater number of uplink subframes per frame than the first TDD configuration and reconfiguring the access node to operate within the second TDD configuration instead of the first TDD configuration.

Additionally or alternatively, the act of changing the TDD configuration to the second TDD configuration could involve broadcasting a system message that specifies the second TDD configuration.

Figure 3:
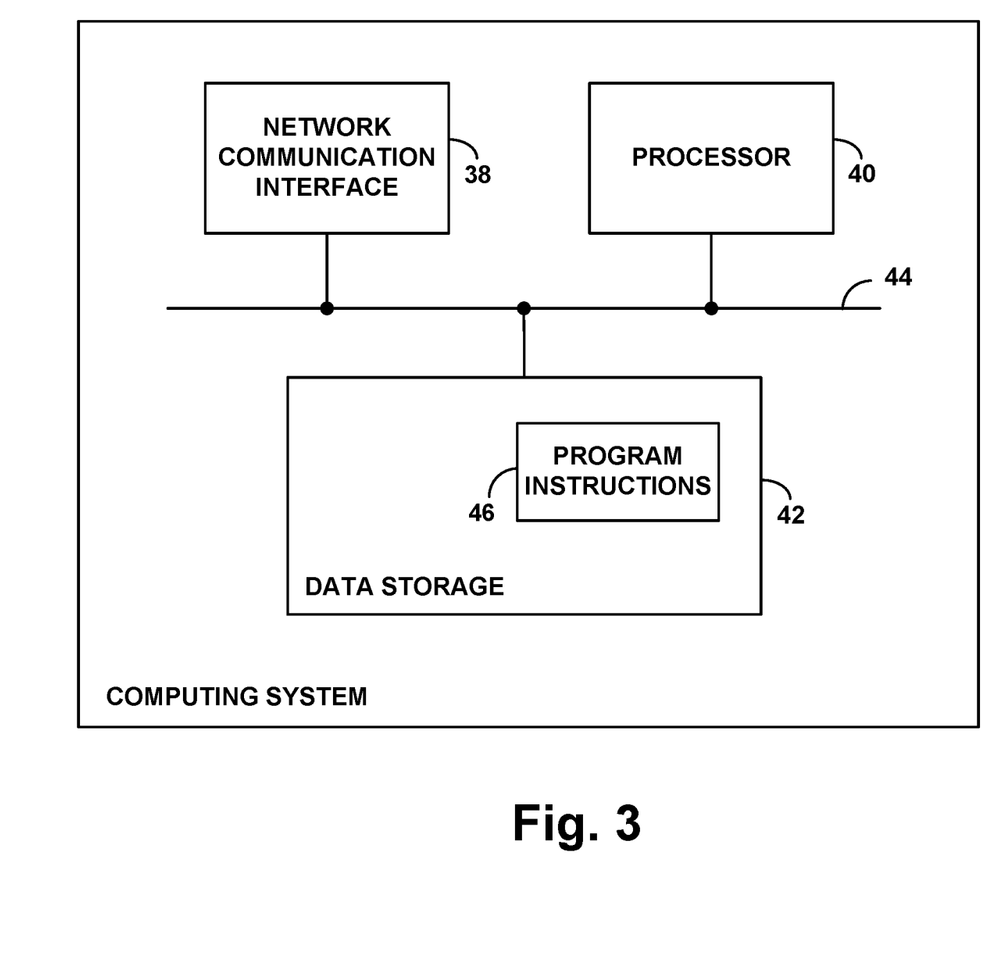
FIG. 3 is a simplified block diagram of an example computing system operable in accordance with the disclosure.

FIG. 3 is next a simplified block diagram of an example computing system that could be operable in accordance with the present disclosure to control configuration of an air interface between an access node and a UE, where the air interface is divided over time into frames and the frames are further divided at least into subframes, and where the air interface operates in accordance with a time-division-duplex configuration that defines at least a number of uplink subframes per frame for communication over the air interface. As noted above, such a computing system could be provided at one or more of the entities shown in FIG. 1, among other possibilities.

As shown in FIG. 3, the example computing system includes at least one network communication interface 38, at least one processor 40, and at least one non-transitory data storage 42, which could be integrated together and/or interconnected by a system bus, network, or other connection mechanism 44.

The at least one network communication interface 38 could comprise a physical network connector (e.g., an Ethernet interface) and associated communication logic (e.g., protocol stacks) to facilitate wired or wireless network communication with various other entities. The at least one processor 40 could comprise one or more general purpose processors (e.g., microprocessors) and/or one or more specialized processors (e.g., application specific integrated circuits). And the at least one non-transitory data storage 42 could comprise one or more volatile and/or non-volatile storage components (e.g., magnetic, optical, or flash storage, necessarily non-transitory).

As shown, the at least one non-transitory data storage 42 could then store program instructions 46. These program instructions could be executable by the at least one processor 40 to cause the computing system to carry out various operations described herein, including but not limited to the operations discussed above in relation to FIG. 2.

Various other features discussed herein can be implemented in this context as well, and vice versa.

Figure 4:
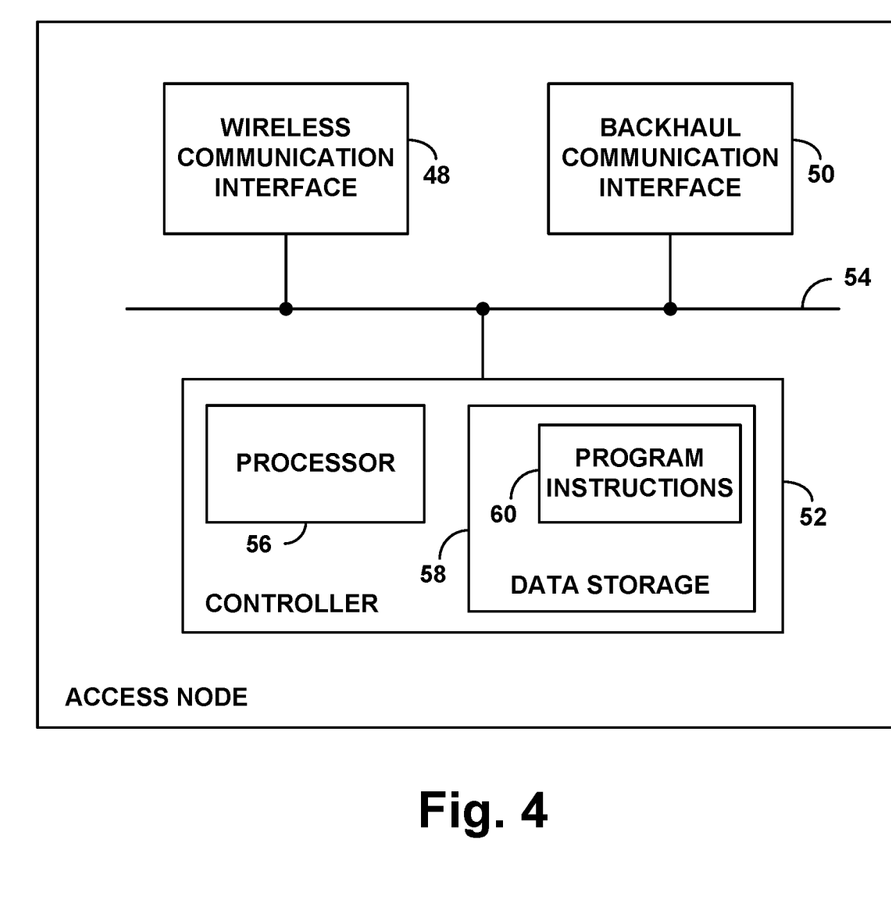
FIG. 4 is a simplified block diagram of an example access node operable in accordance with the disclosure.

FIG. 4 is next a simplified block diagram of an example access node that could be operable in accordance with the present disclosure to control configuration of an air interface between an access node and a UE, where the air interface is divided over time into frames and the frames are further divided at least into subframes, and where the air interface operates in accordance with a time-division-duplex configuration that defines at least a number of uplink subframes per frame for communication over the air interface.

As shown in FIG. 4, the example access node includes at least one wireless communication interface 48, at least one backhaul communication interface 50, and at least one controller 52, all of which could be integrated together and/or communicatively linked together by a system bus, network, or other connection mechanism 54.

In an example implementation, the at least one wireless communication interface 48 could comprise an antenna structure, which could be tower mounted or could take other forms, and associated components such as a power amplifier and a wireless transceiver, so as to facilitate providing coverage on one or more carriers and serving the UE over the air-interface connection. And the at least one backhaul communication interface 50 could comprise network communication interface such as an Ethernet interface, through which the access node engages in backhaul communication.

Further, the at least one controller 52 could comprise at least one processor 56 (e.g., one or more general purpose processors and/or one or more specialized processors) programmed to cause the access node to carry out various operations such as those discussed herein. For instance, the at least one controller 52 could comprise at least one non-transitory data storage 58 (e.g., one or more magnetic, optical, or flash storage components, necessarily non-transitory) which could store program instructions 60 executable by the at least one processor to cause the access node to carry out such operations.

Various other features discussed herein can be implemented in this context as well, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

What is claimed is:

1. A method for controlling configuration of an air interface between an access node and at least one user equipment device (UE), wherein the air interface is divided over time into frames and the frames are further divided at least into subframes, wherein the air interface operates in accordance with a time-division-duplex (TDD) configuration that defines at least a number of uplink subframes per frame for communication over the air interface, the method comprising:

detecting at least a threshold high rate of uplink voice muting on the air interface, wherein detecting at least the threshold high rate of uplink voice muting comprises detecting one or more instances of uplink voice muting on the air interface, and determining that the one or more instances of uplink voice muting have occurred at a rate that is at least as high as a predefined threshold rate; and responsive to at least the detecting, changing the TDD configuration to increase the number of uplink subframes per frame over the air interface.

2. The method of claim 1, wherein the predefined threshold rate is defined as a number of instances of uplink voice muting per unit time, and wherein detecting an instance of uplink voice muting on the air interface comprises monitoring for absence of expected uplink voice-packet transmission on the air interface from the at least one UE.

3. The method of claim 1, wherein uplink voice muting on the air interface comprises absence of expected voice-packet transmission on the air interface for a threshold time period.

4. The method of claim 1, wherein detecting at least the threshold high rate of uplink voice muting on the air interface is predictive based on historical records of past communications.

5. The method of claim 4, wherein the historical records of past communications indicate a time of day during which a threshold high extent of uplink voice muting on the air interface was detected, wherein changing the TDD configuration to increase the number of uplink subframes per frame over the air interface is further based on a current time of day being the time of day.

6. The method of claim 1, wherein the TDD configuration is a first TDD configuration, and wherein changing the TDD configuration comprises changing the TDD configuration from the first TDD configuration to a second TDD configuration having more uplink subframes per frame than the first TDD configuration, wherein the method further comprises:

after changing the TDD configuration from being the first TDD configuration to being instead the second TDD configuration to increase the number of uplink subframes per frame for communication over the air interface, reverting to the first TDD configuration after a predetermined time period.

7. The method of claim 1, wherein the TDD configuration is a first TDD configuration, and wherein changing the TDD configuration comprises changing the TDD configuration from the first TDD configuration to a second TDD configuration having more uplink subframes per frame than the first TDD configuration, wherein the method further comprises:

after changing the TDD configuration from being the first TDD configuration to being instead the second TDD configuration to increase the number of uplink subframes per frame for communication over the air interface, detecting at least a threshold low rate of uplink voice muting on the air interface; and in response to detecting at least a threshold low rate of uplink voice muting on the air interface, reverting to the first TDD configuration.

8. The method of claim 1, wherein the TDD configuration is a first TDD configuration, and wherein changing the TDD configuration comprises changing the TDD configuration from the first TDD configuration to a second TDD configuration having more uplink subframes per frame than the first TDD configuration, wherein changing the TDD configuration to the second TDD configuration comprises:

selecting the second TDD configuration based on the second TDD configuration having a greater number of uplink subframes per frame than the first TDD configuration; and reconfiguring the access node to operate within the second TDD configuration instead of the first TDD configuration.

9. The method of claim 1, wherein the TDD configuration is a first TDD configuration, and wherein changing the TDD configuration comprises changing the TDD configuration from the first TDD configuration to a second TDD configuration having more uplink subframes per frame than the first TDD configuration, wherein changing the TDD configuration to the second TDD configuration comprises:

broadcasting a system message that specifies the second TDD configuration.

10. The method of claim 1, wherein the detecting and changing are carried out by the access node.

11. A computing system configured to control air interface communication of an air interface between an access node and at least one user equipment device (UE), wherein the air interface is divided over time into frames and the frames are further divided at least into subframes, wherein the air interface operates in accordance with a time-division-duplex (TDD) configuration that defines at least a number of uplink subframes per frame for communication over the air interface, the computing system comprising:

at least one processor;
non-transitory data storage; and
program instructions stored in the non-transitory data storage and executable by the processing unit to carry out operations including:

detecting at least a threshold high rate of uplink voice muting on the air interface, wherein detecting at least the threshold high rate of uplink voice muting comprises detecting one or more instances of uplink voice muting on the air interface, and determining that the one or more instances of uplink voice muting have occurred at a rate that is at least as high as a predefined threshold rate, and responsive to at least the detecting, changing the TDD configuration to increase the number of uplink subframes per frame over the air interface.

12. The computing system of claim 11, wherein the predefined threshold rate is defined as a number of instances of uplink voice muting per unit time, and wherein detecting an instance of uplink voice muting on the air interface comprises monitoring for absence of expected uplink voice-packet transmission on the air interface from the at least one UE.

13. The computing system of claim 11, wherein uplink voice muting on the air interface comprises absence of expected voice-packet transmission on the air interface for a threshold time period.

14. The computing system of claim 11, wherein detecting at least the threshold high rate of uplink voice muting on the air interface is predictive based on historical records of past communications.

15. The computing system of claim 11, wherein the TDD configuration is a first TDD configuration, and wherein changing the TDD configuration comprises changing the TDD configuration from the first TDD configuration to a second TDD configuration having more uplink subframes per frame than the first TDD configuration, wherein the operations further include:

after changing the TDD configuration from being the first TDD configuration to being instead the second TDD configuration to increase the number of uplink subframes per frame for communication over the air interface, reverting to the first TDD configuration after a predetermined time period.

16. The computing system of claim 11, wherein the TDD configuration is a first TDD configuration, and wherein changing the TDD configuration comprises changing the TDD configuration from the first TDD configuration to a second TDD configuration having more uplink subframes per frame than the first TDD configuration, wherein the operations further include:

after changing the TDD configuration from being the first TDD configuration to being instead the second TDD configuration to increase the number of uplink subframes per frame for communication over the air interface, detecting at least a threshold low rate of uplink voice muting on the air interface; and in response to detecting at least a threshold low rate of uplink voice muting on the air interface, reverting to the first TDD configuration.

17. An access node configured to control wireless connectivity of at least one user equipment device (UE) with the access node, the access node comprising:

a wireless communication interface including an antenna structure through which the access node provides service on an air interface, wherein the air interface is divided over time into frames and the frames are further divided at least into subframes, wherein the air interface operates in accordance with a time-division-duplex (TDD) configuration that defines at least a number of uplink subframes per frame for communication over the air interface;

a backhaul communication interface through which to communicate with other entities; and a controller, wherein the controller is configured to cause the access node to carry out operations including:

detecting at least a threshold high rate of uplink voice muting on the air interface, wherein detecting at least the threshold high rate of uplink voice muting comprises detecting one or more instances of uplink voice muting on the air interface, and determining that the one or more instances of uplink voice muting have occurred at a rate that is at least as high as a predefined threshold rate; and responsive to at least the detecting, changing the TDD configuration to increase the number of uplink subframes per frame over the air interface.

18. The access node of claim 17, wherein the controller comprises a processor, non-transitory data storage, and program instructions stored in the non-transitory data storage and executable by the processing unit to cause the access node to carry out the operations.

* * * * *